Oct. 2, 1962     C. CHANDLER     3,056,202
POWERED CUTTING TOOLS
Filed Feb. 21, 1961
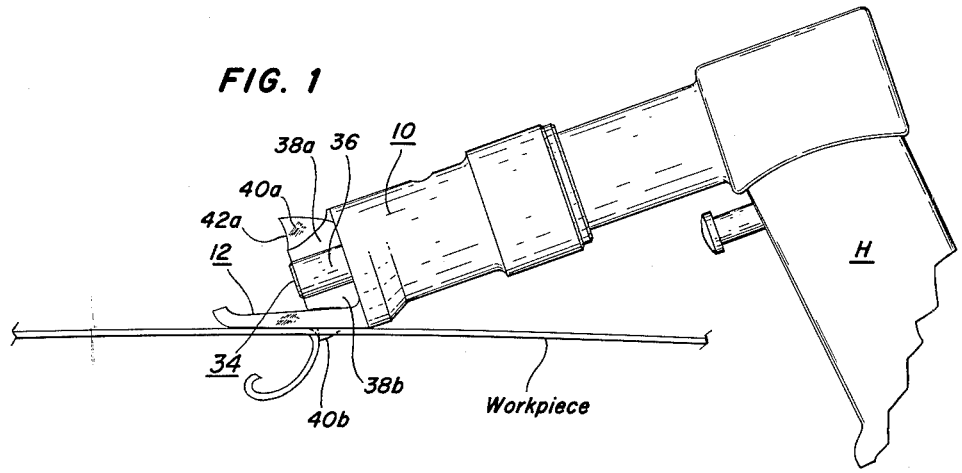
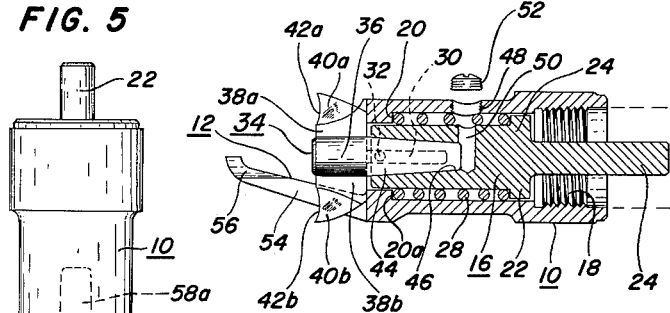
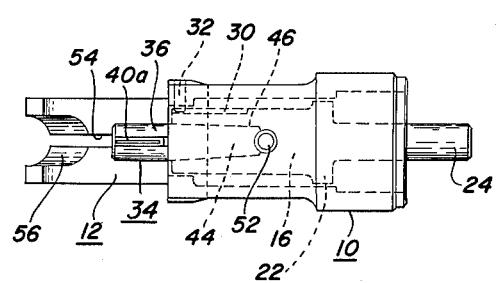
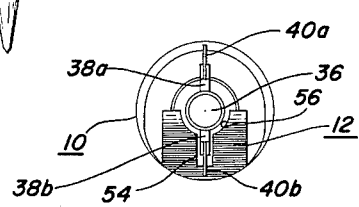
INVENTOR
*CLARK CHANDLER*
BY
ATTORNEY

United States Patent Office 3,056,202
Patented Oct. 2, 1962

3,056,202
POWERED CUTTING TOOLS
Clark Chandler, 1221 Harrison Ave., Panama City, Fla.
Filed Feb. 21, 1961, Ser. No. 90,727
5 Claims. (Cl. 30—277)

This invention relates to improvements in powered cutting tools, and more particularly to an improved, power-operated cutting tool, sometimes termed a panel cutter or power shear, designed for automobile body repair work, although it may of course be used to good advantage in any and all fields requiring straight and/or curved line cuts to be simply, quickly and effectively made in metal sheets, panels and like workpiece sheets by means of a hand-type tool, as distinguished from a large-size cutting-out or stamping machine. The present application is a continuation-in-part of my earlier application Serial No. 21,663, filed April 12, 1960, entitled "Power Tools," now abandoned.

While so-called panel cutters are well known, the prior panel cutters are in general objectionable in one or more respects such as faulty design, cumbersome or heavy construction, slow operation, difficulty in holding same on a predetermined cutting line and the like. While such objections have been overcome by the panel cutter disclosed and claimed in my copending application Serial No. 612, filed January 5, 1960, now Patent No. 3,003,237, it was early recognized that other cutting tool designs performing to the same high degree were possible of attainment, such resulting in the development of the present cutting tool.

Stated broadly, an object of this invention is the provision of a panel-cutter type of cutting tool having all of the advantages of the panel cutter according to my aforesaid application Serial No. 612, and which, in addition, possesses the further advantage of even more simple, compact design and a more direct and effective application of the impact forces from power hammer to workpiece than is possessed by my prior panel cutter.

More particularly, it is an object of the present invention to provide an improved panel or sheet-material cutting tool that will work on any of the conventional impact hammers, either air or electric, characterized by a reciprocating, double-edged cutting blade, rather than by the pivoted blade employed in the tool of my aforesaid prior application.

A more specific object of the invention is the provision of an improved reciprocating-blade type of panel or sheet cutting tool which is characterized by a more simple design and higher operating efficiency than the prior cutting tools of the reciprocating-blade type known in the art.

Still another object of the invention is the provision of a reciprocating-blade type of panel cutter which incorporates improved and simplified means for retaining the cutting tool and further provides for simple reversal and interchange of cutting tool when such becomes necessary or desirable.

Yet a further object of the present invention is the provision of a panel cutter incorporating a workpiece-engaging foot or shoe member affixed to its relatively forward (working) end, the design and construction of which is such as to assist materially in adapting the cutter to receive types of reciprocable cutting tools, i.e. punches, cold chisels and the like, other than the double-bladed reversible cutting tools for which the cutter of the invention was more particularly designed.

The above and other objects and features of advantage of the improved reciprocating blade-type panel cutter of the present invention will be apparent from the following detailed description thereof, in which reference is had to the accompanying drawing, wherein . . .

FIG. 1 is a broken-away side elevational view of my improved panel or sheet-cutting tool associated with an impact hammer, which illustrates both its manner of use and the way in which the scrap curls below the workpiece rather than upwardly therefrom as is customary;

FIG. 2 is a vertical, longitudinal section taken through the tool head, cutter blade and shoe constituting the cutting tool proper of the invention, which illustrates interior construction and design, as well as the manner of coupling same to an impact hammer, which latter is shown in broken lines;

FIG. 3 is a top plan view of the cutting tool illustrated in the prior views, separated from the impact hammer;

FIG. 4 is an end elevation of the cutting tool as the latter is viewed from the left in FIG. 3; and FIG. 5 is a side elevation of the cutting tool head according to the prior views, which shows its adaptability in mounting conventional punch and chisel-type cutting blades.

Referring to the drawing in greater detail, a power-operated panel and/or sheet-cutter according to the present invention comprises a tool head in the form of a tubular barrel or housing member 10 having a workpiece-engaging foot or shoe member 12 (which will be later described in detail) affixed to its relatively forward end and mounting in its bore portion generally designated 14 a reciprocating plunger 16. The rearward end of the housing member is preferably externally enlarged and has a similarly enlarged bore portion 18 which is internally threaded as shown, so as to be capable of threadedly receiving the externally threaded barrel of a power (usually air-operated) hammer designated H, which is generally shown in full lines in FIG. 1 and in broken lines in FIG. 2. At its forward end the bore 14 of the housing terminates in a smaller-diameter bore portion 20, the differential diametering of the bore portions 14 and 20 resulting in the formation of an axially facing internal shoulder 20a between said bore portions.

As best seen in FIG. 2, the plunger 16 is formed with an enlarged-diameter, rear-end portion 22 and with a rearward, axially extending stem portion 24 which projects into the hammer H a distance such that it will be impacted by the percussive or impactor element thereof (not shown). Said rear-end portion operates and has sliding bearing in the main bore portion 14 of the housing, and the forward end of the plunger proper similarly has bearing in the smaller-diameter bore portion 20 of the housing member. The plunger 16 is normally maintained in its retracted or rightwise position by means illustratively comprising a spring 28 disposed in encircling relation about the plunger proper and being reactive between the under face of the plunger-end portion 22 and the aforesaid, axially facing internal shoulder 20a at the forward end of the housing member 10.

To prevent angular turning of the plunger 16 within the housing member, it is provided in its outer surface with a keyway 30 with which a pin-type key 32 coacts, said key being shown to project raidially-inwardly through the housing wall at the forward end of the housing, which has enlarged external diameter at that end.

According to the invention, the aforesaid plunger 16 serves as a retainer for a double-edged, reversible cutting tool generally designated 34 which preferably is of the type having plural transverse cutting edges disposed on a diameter of the tool. More particularly, such a cutting tool comprises a working end and a shank end, said working end in turn comprising a generally cylindrical central or hub part 36, from which extends radially opposed, co-planar cutting blades 38a, 38b, whose outer portions are thinned as compared to their thicker root portions and which have forward, radially extending edges 40a, 40b, whose outer portions are formed forwardly concave and ground, thus to provide forwardly facing concave cutting edges 42a, 42b, as best shown in FIG. 2. The shank-end portion of the tool comprises a tapered shank or tang 44 extending rearwardly from its aforesaid working end and adapted to seat in an axially extending, forwardly opening tapered socket 46 provided in the plunger 16. By proper selection of the complemental taper of both its shank and socket surfaces, the cutting tool will be firmly held by friction against any and all normal forces which would tend to separate it from the plunger.

Means for effecting ready removal of the cutting tool 34 when and if such is desired are provided, such illustratively comprising an opening 48 formed in the wall of the housing member and a cross hole 50 formed in the body portion of the plunger 16 at a location along the length thereof which is such that the rearward end of the tapered cutting-tool shank or tang 44 projects a slight distance thereinto, said opening and cross hole being so located relatively of one another that they are in registry when the plunger is in its retracted position. Thus, to remove the cutting tool, it is necessary only to insert a punch or drift pin into the aligned opening 48 and hole 50 and thereupon strike same with a hammer or like tool, whereupon the frictional grip of the socket wall on the tapered surface of the cutting tool shank will be broken. Preferably, the opening 48 in the housing is normally closed as by a removable screw 52, it being contemplated that this screw will be removed by unthreading same from the housing preliminary to inserting the punch or drift pin into said holes 48, 50 as aforesaid and replaced after tool reversal or interchange has been effected.

Referring to FIGS. 2 and 3, the aforesaid foot or shoe member 12, which will be hereinafter, for convenience, referred to simply as a "shoe" comprises a flat plate-like element having a central-longitudinal slot 54 therein, which extends forwardly-upwardly from a forward, lower edge portion of the housing member 10 at an angle of approximately 30° to the longitudinal axis of said member and has length such that its forward edge line substantially intersects said axis. Accordingly, as seen in FIG. 2, and this assumes that the cutting tool 34 is turned so that its opposed cutting blades 38a, 38b are disposed on a vertical diameter, the then lower cutting-blade edge 42b will project a small distance through the shoe slot 54 when the plunger 16 is in its retracted position (as in FIG. 2) and a greater distance as the plunger moves forwardly on its working stroke. Thus, the shoe 12 serves not only as a tool rest and/or steadying means which also determines the angular position of the cutting tool for optimum cutting action, but also, in conjunction with the curvature of the cutting edge projecting through its slot, as a means for deflecting the scrap downwardly as is illustrated in FIG. 1. It is to be understood that the length of the shoe 12 is such that its free forward end projects an appreciable distance beyond the most advanced position of the cutting tool 34, and thus the shoe serves the added purpose of protecting articles or parts of the body against the action of the tool cutting edges when the tool is accidentally moved against same head-on.

According to yet another feature of the invention, the shoe slot 54 at its forward end opens into a forwardly-opening, semi-circular recess 56 provided in the front edge of the shoe, said recess being disposed with its center lying on the extended axis of the housing member 10 and having diameter somewhat greater than that of the cylindrical hub part of the cutting tool 34. Hence, the cutting tool 34, following its disconnection from the plunger socket, may be freely moved axially through the shoe and, conversely, said tool turned 180°, or a replacement tool, may be moved axially through the shoe until its shank or tang 44 seats in the plunger socket.

While the operation of a panel cutter as described in the foregoing and illustrated in the accompanying drawings will, it is believed, be clear to persons skilled in the art, it is briefly summarized as follows: The tool is set up for operation as is illustrated in FIG. 2, in which position of the cutting tool proper 34, one of its cutting edges 42a, 42b (shown to be the lower cutting edge 42b) will project through the slot 54 of the shoe, in readiness to perform its cutting function. With the tool head operatively associated with the impact hammer H, it, or rather its shoe 12, is placed against the metal panel or sheet to be cut. Normally, the cut to be made is started by any suitable means and the tool is of course placed against the workpiece with said cutting edge registered with the starting cut. Upon the tool being put into operation, the operator need only guide the tool along the predetermined line of cut, since the impact hammer H supplies the actual shearing or cutting force to the cutting blade by way of plunger 16. It will also be observed that the design of the present panel cutter is such that the impact forces applied to the plunger 16 by the hammer striker or impactor element are transmitted substantially in a straight line to the one cutting blade 38a, 38b, whose edge is then functioning as the operative cutting edge. Thus, the full impact forces generated at the hammer are effectively transmitted to said cutting edge.

The foregoing described and illustrated cutting tool construction is of further advantage in that it permits of cutter-blade reversal by the simple procedure of dismounting the cutting tool 34 from the retaining plunger 16, withdrawing it axially from the tool head, turning it 180°, and then remounting it in the plunger. This blade reversibility feature of the invention gives the advantage of doubling the life of the blade and/or of protecting the tool owner against the tool being put out of service in the event one cutting blade is broken or becomes dulled, for example.

Also, consequent to the ground cutting edges 42a, 42b being formed outwardly (forwardly) concave, in conjunction with the operative cutting edge working through a shoe which is positioned directly against the workpiece being cut, the strip of scrap resulting from the cutting operation curls downwardly from the workpiece, as is generally indicated in FIG. 1, rather than upwardly therefrom, as is usual. Thus, the workpiece itself serves to protect the operator of the tool from scrap which would otherwise tend to discharge or be thrown in his direction.

While designed primarily for a double-bladed, reversible cutting tool as illustrated and described, other types of cutting tools such as punches, cold chisels and the like provided with a tapered shank or tang of a size and taper to be receivable in the plunger socket 46 and whose tool structure is such as to enable it to reciprocate through the semi-circular end recess 56 of the shoe may be substituted in place of said double-bladed tool. The capability of the present panel cutter to mount cold chisels, punches and any like cutting implements is intended to be illustrated in FIG. 5, wherein reference numeral 58 designates a conventional cold chisel whose tapered shank 58a fits the plunger socket 46, and whose size and sectional configuration are such that it can move through the recess 56 in the shoe end-edge. As also suggested in FIG. 5, the shoe 12 may provide some lateral support and guidance for the cold chisel 58, as by fitting the shoe-end recess to the cylindrical body of the chisel so that the latter in effect has sliding bearing on the shoe wall defining said recess.

Without further analysis, it will be evident that the powered panel cutter of the invention achieves the objectives outlined therefor in the above in simple, effective and thoroughly dependable manner. However, as many changes could be made in carrying out the above constructions without departing from the scope of the invention, it is intended that all matter contained in the above description or shown in the accompanying drawing shall be interpreted as illustrative and not in a limiting sense.

I claim:

1. A powered panel cutter adapted for attachment to and operation by a power hammer having an impactor element comprising, in combination, a tubular housing having means at its relatively rearward end for attaching same to said power hammer, a plunger reciprocable in said housing and being driven on its working stroke by said impactor element, spring means in said housing for effecting return movement of said plunger, a reciprocable cutting tool reversibly and removably connected to said plunger for reciprocatory movement therewith and having a tool body and a working end disposed forwardly of said tubular housing, a workpiece-engaging shoe integral with and extending forwardly from the relative lower portion of the forward end of said tubular member, the working end of said cutting tool comprising opposed coplanar cutting blades disposed on the relatively vertical diameter of the tubular member, said shoe having plate form and being disposed in an upwardly inclined plane which is intersected by that of the cutting blades, the outer portions of the relatively forward edges of said cutting blades being sharpened and serving as cutting edges, said shoe having a central-longitudinal slot through which the relatively lower cutting edge projects and is movable with reciprocatory travel of the plunger, said cutting tool being bodily reversible with respect to the shoe, thereby to present either one of the cutting edges to the workpiece.

2. A powered panel cutter according to claim 1, wherein the forward end-edge line of the shoe intersects the extended longitudinal axis of the tubular housing.

3. A powered panel cutter according to claim 1, wherein the shoe slot opens through the forward end edge of the shoe.

4. A powered panel cutter according to claim 1, wherein the shoe terminates at its forward end in an edge line which intersects the extended longitudinal axis of the tubular housing and said slot opens through said end edge.

5. A powered panel cutter according to claim 1, wherein the shoe terminates at its forward end in an edge line which intersects the extended longitudinal axis of the tubular housing and said slot opens into a forwardly opening, substantially semi-circular recess in said front edge, said recess having predetermined radius slightly larger than that of the tool body, whereby the tool is bodily movable in axial direction through the shoe.

References Cited in the file of this patent

UNITED STATES PATENTS

| | | |
|---|---|---|
| 712,843 | Paul | Nov. 4, 1902 |
| 1,267,698 | Roberts et al. | May 28, 1918 |
| 1,624,853 | Winter | Apr. 12, 1927 |
| 2,172,984 | Moray | Sept. 12, 1939 |
| 2,199,380 | Walraven | May 7, 1940 |
| 2,282,729 | Knauf | May 12, 1942 |